United States Patent [19]

Da Re'

[11] Patent Number: 4,890,795
[45] Date of Patent: Jan. 2, 1990

[54] METHOD FOR THE PRODUCTION OF WOOD FLOUR BASED FILLERS FOR PLASTIC MATERIALS

[75] Inventor: Mario Da Re', Turin, Italy
[73] Assignee: Fiat Auto S.p.A., Turin, Italy
[21] Appl. No.: 252,071
[22] Filed: Sep. 30, 1988
[30] Foreign Application Priority Data Sep. 30, 1987 [IT] Italy ............................ 67826 A/87

[51] Int. Cl.$^4$ ...................... B02C 19/12; B02C 23/18
[52] U.S. Cl. ........................................ 241/3; 241/15; 241/21; 241/22
[58] Field of Search .................. 241/3, 21, 22, 17, 15, 241/23; 524/13, 14

[56] References Cited

U.S. PATENT DOCUMENTS

| | | | |
|---|---|---|---|
| 1,406,938 | 2/1922 | Cunningham | 241/23 X |
| 2,272,742 | 6/1938 | Fiedler | 524/14 |
| 2,364,721 | 12/1944 | Kassay et al. | 241/22 X |
| 2,380,214 | 7/1945 | Burrell | 241/17 X |
| 2,663,907 | 12/1953 | Downing et al. | 241/3 X |
| 2,681,893 | 6/1954 | Hessel et al. | 524/14 |
| 4,128,696 | 12/1978 | Goebel et al. | 524/14 X |

FOREIGN PATENT DOCUMENTS

| | | | |
|---|---|---|---|
| 2478153 | 9/1981 | France | 241/21 |
| 204050 | 11/1983 | Japan | 524/13 |
| 2161399 | 1/1986 | United Kingdom | 241/23 |

Primary Examiner—Joseph M. Gorski
Attorney, Agent, or Firm—Sughrue, Mion, Zinn, Macpeak, and Seas

[57] ABSTRACT

In order to provide a granular material for use as a filler for plastics material and adapted to improve the thermal, mechanical and aesthetic characteristics of the plastics material incorporating it, the wood flour is impregnated with an aqueous solution of melamine resin and dimethyl ketone or methyl-ethyl ketone and, after drying, the mass of wood flour thus impregnated is milled to obtain granules of dimensions suitable for inclusion in the matrix of the plastics material.

3 Claims, No Drawings

METHOD FOR THE PRODUCTION OF WOOD FLOUR BASED FILLERS FOR PLASTIC MATERIALS

The present invention relates to a method for the production of a wood flour based granular material for use as a filler for plastics material and to the granular material produced by this method.

Wood flour has been used for some time as a filler for plastic materials, both of the thermosetting type, for example phenolic resins, and of the thermoplastics type, for example polypropylene.

The wood flour included in the polymer matrix mainly fulfills the role of a cheap filler and, although its use gives results which are considered satisfactory in relation to the applications for which the polymer materials are intended, the resultant mechanical, thermal and aesthetic, characteristics have considerable limitations.

From the point of view of the mechanical characteristics, the addition of wood flour fillers does not lead to advantages for the polymer matrix, in fact, it limits its use.

From the point of view of the thermal characteristics, the thermal stability is insufficient to satisfy current requirements, particularly in relation to the application of the polymer material to the production of supports, panelling and structural elements for the inside of a motor vehicle in a horizontal position, which are subject to large temperature ranges.

As far as the aesthetic characteristics are concerned, the difficulty of distribution of the filler and its poor compatibility with the polymer matrix cause an uneven appearance which is difficult to mask with pigments or other additives.

The object of the present invention is to provide a method which enables the characteristics of compatibility of the wood flour with the polymer matrix to be improved, with a resultant improvement in the reinforcing characteristics of the filler material and finally with an improvement in the mechanical, thermal and aesthetic characteristics of the plastic material incorporating the filler.

For this purpose, the subject of the invention is a method characterised in that it includes the steps of impregnating a mass of wood flour with an aqueous solution of melamine resin and a ketone selected dimethyl ketone and methyl-ethyl ketone drying the impregnated wood flour, and milling the dried mass to a particle size suitable for inclusion as a filler in plastics materials.

A further subject of the invention is constituted by the granular material which can be obtained by the afore-mentioned method.

In the method according to the invention an aqueous solution of melamine resin is prepared comprising from 30 to 50 parts by weight water and from 30 to 50 parts wt of dimethylketone or methyl-ethyl ketone per 100 parts wt of melamine.

The aqueous solution is then added to wood flour in a turbo-mixer in the amount of about 30–50 parts by weight referred to 100 parts of wood flour. The thus obtained paste is fed into a screw extruder where water is further removed and the paste is extruded as a web which is then dried in a vacuum oven. The dried web is then milled to the desired particle size.

The granular material thus obtained may possibly be treated with alkoxy silane compounds such as those which are used as adhesion promoters to coat glass fibers and make them compatible with plastic materials; their addition is particularly advantageous when the fillers are intended for reinforcing polyolefinic plastic materials, such as polypropylene in particular.

In fact, the silane-wood flour-melamine sequence improves the characteristics of adhesion between the cellulose and the thermoplastic matrix. The silane compounds are typically added in concentrations of up to 5% by weight of the mass of wood flour. It is also possible to add the silane compounds directly to the impregnating solution of melamine resin.

The fillers obtained by means of the method according to the invention may be associated with other fillers, such as mineral fillers, possibly silanised, for example, mica, longer or shorter glass fibres, glass balls, spherulitic silicates, toughening materials (for example, elastomers), and expanding salts.

These fillers may be used as reinforcements for both thermoplastic polymer materials, such as polypropylene, polyethylene, polyesters, polyamides, etc., and thermosetting compounds, such as reinforced unsaturated polyesters intended for injection moulding, direct-compression moulding and the like.

The thermoplastic material may be in the form of injection-moulding granules, in the form of extruded strips for thermoforming, or in the form of pellets or briquettes intended for direct compression moulding after high-frequency pre-heating.

EXAMPLE

Granular fillers are obtained by introducing into a turbo-mixer 100 parts by wt of wood flour with 35 parts by wt of a solution prepared from 100 parts by wt of melamine, 40 parts by wt of water and 40 parts by wt of methyl-ethyl ketone.

The paste is then fed to a twin-screw extruder at an initial temperature of about 10° C. and extruded as a web which is then dried and milled to a particle size of 15–50 microns.

Silanisation of the fillers was accomplished by adding to the fillers mass 5% by weight of tetraethoxysilane.

The reinforcing material was used as a filler for thermoplastic polypropylene granules in the amount of from 30 to 60% wt based on polypropylene. The samples obtained by means of injection moulding of the polypropylene granules reinforced with fillers according to the invention enabled the improvement in the following characteristics to be ascertained in comparison with similar samples of polypropylene reinforced with wood flour according to conventional techniques.

1. Thermal characteristics:
   (a) increased bending temperature,
   (b) improved dimensional stability,
   (c) reduced thermal expansion.
2. Mechanical characteristics:
   (a) increased rigidity,
   (b) impact resistance,
   (c) improved retention of moulding inserts.
3. Aesthetic characteristics:
   (a) improved surface appearance,
   (b) improved capacity for being painted and glued.

I claim:

1. A method for production of a wood flour based granular material for use as a filler for plastic materials, comprising the steps of impregnating a mass of wood flour with an aqueous solution of melamine resin and a ketone selected from the group consisting of dimethyl ketone and methyl-ethyl ketone, drying the impregnated wood flour, thereby yielding a dried mass, and milling the dried mass to a particle size suitable for inclusion as a filler in plastic material, thereby yielding a milled dried mass.

2. A method according to claim 1, wherein the wood flour is impregnated with an aqueous solution comprising from 30 to 50 parts by wt of water and from 30 to 50 parts by wt of said ketone per 100 parts by wt of said melamine resin, said aqueous solution being added to said wood flour in an amount of from 30 to 50 parts by wt per 100 parts by wt of said wood flour.

3. A method according to claim 1, including adding to the milled dried mass at least one alkoxy silane compound in a quantity of up to 5% by weight of said milled dried mass.

* * * * *